May 26, 1953 C. L. JOHNSON 2,639,739
DOWEL PIN CUTTING AND BEVELING MACHINE
Filed March 21, 1949 2 Sheets-Sheet 2
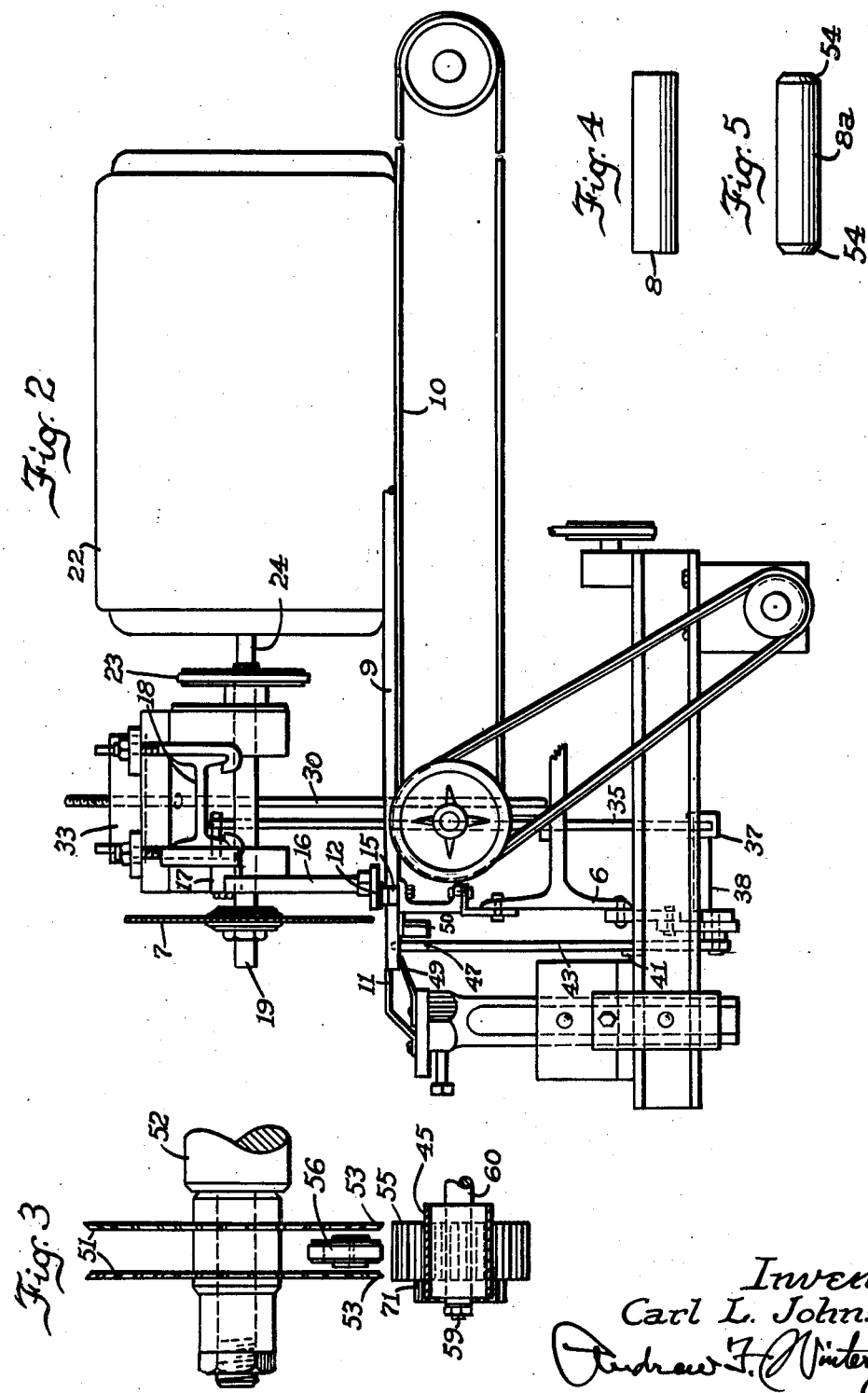
Inventor
Carl L. Johnson Patented May 26, 1953

2,639,739

UNITED STATES PATENT OFFICE 2,639,739

DOWEL PIN CUTTING AND BEVELING MACHINE

Carl L. Johnson, Rockford, Ill.

Application March 21, 1949, Serial No. 82,556

5 Claims. (Cl. 144—30)

1

This invention relates to a new and improved dowel pin cutting and bevelling machine.

The principal object of my invention is to provide a machine of the kind mentioned capable of speedy high production of closely uniform, smoothly bevelled dowel pins at low cost and of whatever length is desired, the dowel pin blanks being cut in multiple to length from pieces of long round wooden rod material and the dowel pins being, thereafter, individually bevelled simultaneously at both ends.

The machine of my invention embodies improved rod feeding and clamping means and cutting means designed for speedy quantity production of the pin blanks of closely uniform length at low cost, as contrasted with the one pin at a time methods employed heretofore, which were necessarily much slower and much more costly. My machine also includes improved pin blank ejector and conveyor means, but my invention is more particularly concerned with the provision of novel bevelling means in which the dowel pin blanks, while supported in spaced parallel relationship on a sprocket that turns at a fast feed rate, are driven frictionally by contact with an endless belt that runs above the sprocket and between the two bevelling saws or cutters, whereby to enable producing dowel pins uniformly smoothly bevelled at both ends in such rapid-fire succession that there is no difficulty in this end of the machine keeping pace with the other end where the pin blanks are cut in multiple.

The invention is illustrated in the accompanying drawings in which

Fig. 2 is an end view taken from the feed-in end;

Fig. 3 is a cross-section on line 3—3 of Fig. 1, and

Figs. 4 and 5 are illustrations of a dowel pin blank and a finished dowel pin, respectively, as produced in the two steps performed at the opposite ends of the present machine.

The same reference numerals are applied to corresponding parts throughout these views.

Figure 1:
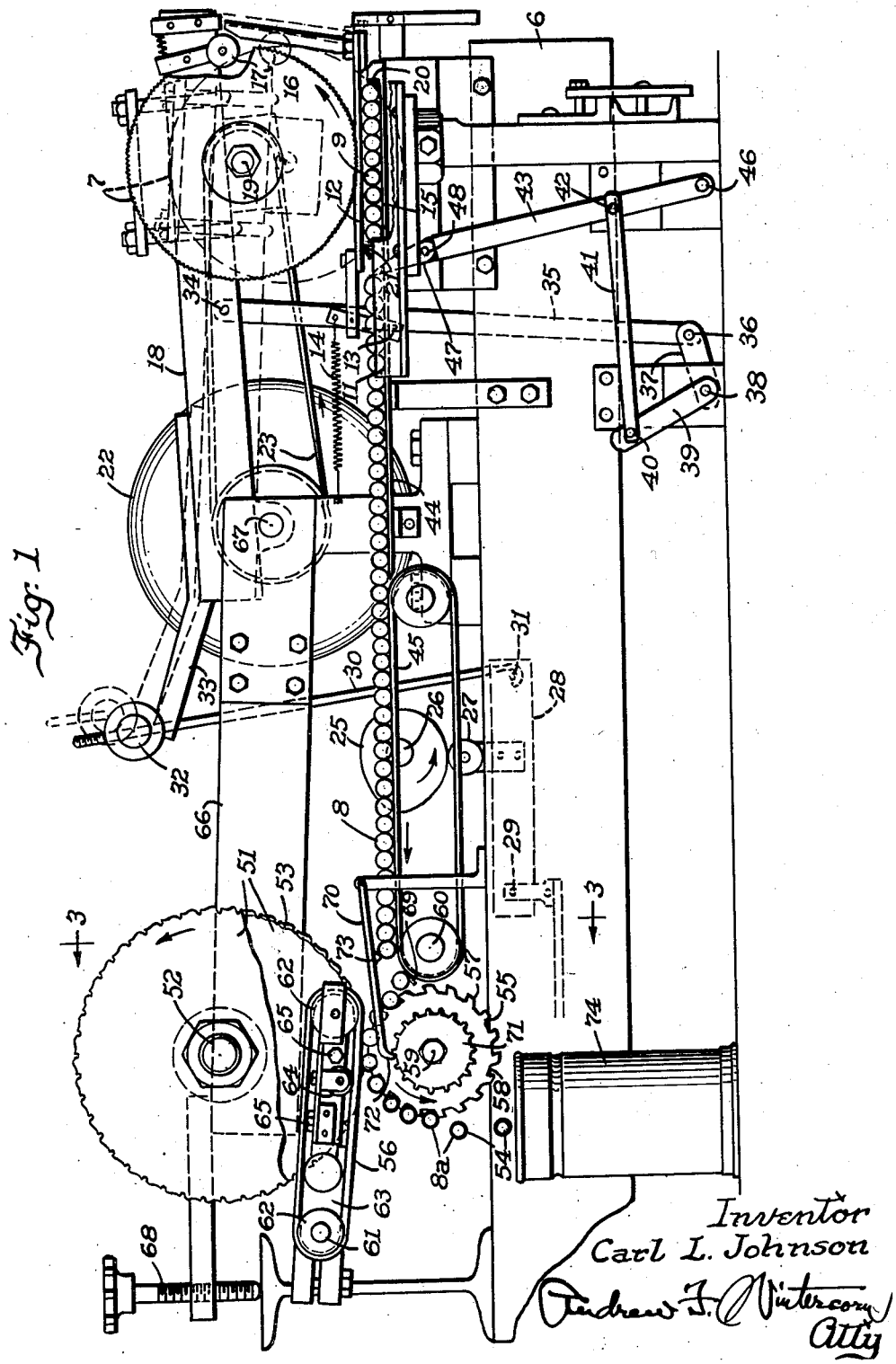
Fig. 1 is a side view of a machine made in accordance with my invention.

Referring to the drawings, the reference numeral 6 designates an elongated frame on the feed-in end of which a circular saw 7 is operated to cut dowel pin blanks 8 in multiple from long dowel rods 9, the latter being fed side by side in multiple on a suitably continuously driven endless conveyor 10 into abutment with a stop 11, as indicated in Fig. 2, and the stop 11 being properly adjusted relative to saw 7 so that blanks 8 of a desired length will be cut. Suitable hold-down means are employed to clamp the rods 9 during the cutting operation as shown at 12, this clamp being disposed cross-wise of the rods 9 and floatingly pivoted at its one end, as at 13,

2 on the frame 6 and normally spring biased, as indicated at 14, to a slightly raised retracted position relative to a table portion 15 on the feed-in end of the frame over which the end portions of the rods 9 project from conveyor 10 and alongside which the saw 7 is arranged to operate, as clearly appears in Fig. 2. Now, the free end of clamp 12 carries an upwardly projecting cam bar 16, the inclined inner face of which forms a track for a springpressed roller 17 that is carried on the end of the rock arm 18 on which the spindle 19 carrying saw 7 is also carried, whereby to apply yielding clamping pressure downwardly to clamp 12 in timed relation to the lowering of the saw 7 on its cutting stroke. See the dotted line position of the saw 7 and roller 17 in Fig. 1, which shows clearly that at least nine dowel pin blanks 8 are cut at a time from as many rods 9. The conveyor 10 is accordingly provided of the proper width to accommodate that many rods 9 in side by side relation. Of course, more rods of a smaller size would be accommodated in the same space when smaller diameter pins are being made, and accordingly more pins would be cut at one time. The floating pivot at 13 allows the clamp 12 to move endwise under pressure of roller 17 working along cam bar 16. This is for the purpose of yieldingly clamping the rods 9 in side by side abutment with one another and as a group in abutment with a shoulder 20 provided on the outer end of table 15, the clamp 12 carrying a bowed leaf spring 21 on the bottom thereof at the far inner end thereof remote from shoulder 20 arranged to engage the innermost rod 9 from the inner side and shove the rod toward the shoulder 20 as far as it will go until the group of nine rods is closely packed together, any further movement of clamp 12 merely compressing spring 21 to make for tighter engagement of the rods sidewise against one another, at the same time that the roller 17, its spring becoming more and more heavily loaded the farther down the saw 7 is moved in the cutting stroke, exerts increasing downward pressure on the clamp 12. Obviously, on the upward or retracting movement of the saw 7, the clamp 12 is released so as to permit the rods 9 to feed forward again under the frictional thrust of conveyor belt 10. My invention is not limited to the hold-down means just described, inasmuch as I may use an electro-magnetically operated hold-down that is energized automatically in properly timed relation to the cutting stroke of saw 7. So much for the cutting operation, beyond stating that the saw spindle 19 is driven by an electric motor 22 through a belt and pulley driving connection indicated at 23, the drive permitting oscillation of the rocker arm 18 around the armature shaft 24 of the motor as an axis as required for the cutting stroke of the saw. The cam 25, turning with the suitably continuously driven spindle 26 carried on frame 6, serves as the means for transmitting oscillatory movement to the arm 18. This spindle 26 may be driven through a reduction gear box from motor 22 so as to be driven whenever the saw 7 is driven in the operation of the machine. The cam 25 engages a follower roller 27 carried on an arm 28 pivoted at 29 on the frame 6. A link 30 pivotally connected at 31 to the free end of arm 28 is pivotally and adjustably connected at 32 with a projection 33 on the pivoted end of arm 18. The weight of the arm 18 and the saw supporting spindle 19 on its outer end is enough to keep the follower roller 27 in contact with the cam 25. The arm 18 is pivotally connected at 34 with a link 35, the lower end of which is pivotally connected at 36 with an arm 37 attached to a shaft 38 mounted for oscillation in bearings in a leg of frame 6. Another arm 39 attached to shaft 38 is pivotally connected as at 40 with a link 41 which is pivotally connected at 42 with a rocker arm 43 adapted to eject the freshly cut dowel pin blanks 8 from the cutting position at the feed-in end of the machine and move them onto a support 44 leading to the continuously driven endless conveyor 45 that serves to convey the blanks to the other end of the frame where the bevelling operation next to be described is performed. The rocker arm 43 is pivoted at its lower end on the frame at 46, and on its upper end carries a finger 47 which is spring-pressed in a clockwise direction on pivot 48 toward the limit position shown, so as to be free to yield on the return strokes of the arm, when the finger rides under the ends of dowel rods 9 that have been fed forward by conveyor 10. The finger serves, however, to move the group of freshly cut dowel pin blanks 8 positively to the left in the movement of arm 43 in that direction. The freshly cut blanks 8 rest at one end on a shoulder 49 on stop abutment 11 and at the other end on a table 50 extending in spaced parallel relation to table 15 and coextensive with support 44. The saw 7 operates in the space between tables 50 and 15. Finger 47 operates in the space between table 50 and shoulder 49. Obviously, arm 43 is disposed in the extreme right hand retracted position when saw 7 is lowermost and moves to the left to eject the blanks 8 as the saw 7 is raised. There will always be enough blanks 8 on the support 44 in side by side abutment to keep them in a line and make it unnecessary to provide upwardly reaching guide members on opposite sides of support for contact with the ends of the blanks as they are moved forward by the other blanks moved as a group by finger 47. However, such guides may be provided, if preferred, or deemed necessary. The same is true regarding the provision of guide members along opposite sides of conveyor 45, where none have been shown. Obviously, if such guide members are provided the inner one or ones could be fixed and the outer one or ones adjustable like the stop 11 to accommodate different lengths of pin blanks. Guide or guard means may also be provided above and parallel to support 44 and conveyor 45 to prevent piling up of pins under thrust from behind the row when one group after another is shoved forward by finger 47. A guide or guard extension rearwardly from the latter guide is also preferably provided to extend over the ends of the dowel rods 9 when they are abutting stop 11 so that the finger 47 riding under the rods won't tend to kick them up and cause trouble.

Smooth bevelling of both ends of dowel pins is important for good workmanship in furniture factories and wherever dowel pins are used by the methods used heretofore in the production of dowel pins gave very crude results and it is well-known that there was no uniformity so far as the bevels were concerned, despite the generally prevailing high prices charged for such pins. With my machine I am enabled to bevel both ends of a dowel pin blank simultaneously and in such a way that the same smooth job is assured on each and every pin in large quantity production and at a fraction of the cost of the previous methods, so that much better dowels are made available at a much lower price. In the present machine two spaced coaxial, circular bevelling saws or cutters 51 are mounted in facing relation on a spindle 52 that is driven by an electric motor (not shown) mounted on the frame 6. The bevelled teeth 53 (Fig. 3) on the two cutters 51 cut bevels 54 (Fig. 5) simultaneously on opposite ends of a dowel pin blank 8 as it is fed between and under the cutters on a rotating drum or sprocket 55 while the blank 8 is simultaneously driven by frictional engagement with an endless belt 56 that runs above the sprocket and between the two cutters 51, as clearly appears in Fig. 1. The belt 56 is driven fast enough to assure more than one complete turn of each blank 8 while it is directly between the cutters 51 at the high point of travel with sprocket 55, whereby to insure a complete and smooth bevelling job on both ends of each dowel pin processed in this machine. The teeth 57 of the pin carrier sprocket are spaced properly to receive the blanks 8 freely therebetween to permit easy rotation thereof by the friction drive mentioned, and, of course, the recesses 58 between the teeth are shallow enough to leave about half the thickness of the blanks projecting radially from the periphery of the sprocket for operation of the cutters 51 on the ends thereof without any necessity for any fine adjustments in the mounting of the cutters relative to the sprocket. The sprocket 55 is suitably continuously driven with the conveyor 45 and friction drive belt 56, the drive spindle 59 for the sprocket, the drive spindle 60 for the conveyor 45, and the drive spindle 61 for the belt 56 being all preferably driven together by the same power means in the proper ratio. The latter drive may be from the same motor driving spindle 52 so that all of the correlated mechanism is driven with the cutters 51 in the operation of the machine. The pulleys 62 for friction drive belt 56 are mounted on an arm 63 oscillatably adjustable relative to the bearing for spindle 61 so that the desired closeness of contact between the belt 56 and the dowel pin blanks may be obtained for good drive regardless of wear on the belt, and so that adjustment for change of size of pins may be made. An idler roller 64 is provided between the pulleys 62 running on the lower flight of the drive belt to limit sag of the belt due to pressure on the dowel pin blanks driven thereby, the inner pulley 62 being on one side and the roller 64 on the other side of the high point or crown of the sprocket 55 and hence on opposite sides of that portion of the belt 56 contacting the blank 8 to be driven. The inner pulley 62 is also adjustable endwise of arm 63 away from the companion pulley 62 as indicated at 65 so that slack in the belt may be taken up from time to time. The spindle 52 for cutters 53 is mounted on an arm 66 pivoted at one end on frame 6 at 67 and adjustable up or down relative to the frame by means of hand-screw 68 at its other end, whereby to enable adjusting the cutters 53 vertically relative to sprocket 55 to suit different diameters of pins being operated upon, it being obvious that different sprockets will be provided for use with pins of different diameters. The sprockets 55 are preferably as wide as the pins are long, as shown in Fig. 3, to give adequate support at the ends being bevelled. The bevelled dowel pins are designated by reference numeral 8a in Figs. 1 and 5.

Sprocket 55 is disposed close enough to the spindle 60 for the blanks 8 to roll into the pockets 58 between teeth 57 as they roll off incline 69 from conveyor 45. An escapement member 70 pivoted relative to frame 6 is oscillated by a ratchet wheel 71 turning with sprocket 55 and cooperating with the hooked end 72 of the member 70. Member 70 has a gate projection 73 which stands in the way of the last dowel pin blank 8 on the conveyor 45 so as to release only one blank at a time in correctly timed relation to the turning of sprocket 53 so that a single blank is supplied for each pocket 58. The bevelled pins 8a are dropped off the other side of sprocket 55 into a receptacle 74.

The operation of the machine is believed to be clear from the above description. Assuming all power is turned on for operation of the saw 7, cutters 51, and the conveyor 10, cam 25, conveyor 45, sprocket 55, and drive belt 56, it is obvious that a single operator can attend to the machine by feeding dowel rod material 9 onto the feed-in end of conveyor 10. The rods 9 thereafter move forward automatically and are cut into dowel lengths. Any short butt ends will drop out between table 50 and stop 11. The operator need only be careful to see to it that nine dowel rods at a time are laid alongside one another on the conveyor 10, in order to insure proper functioning of the clamp 12, and he should also be sure that these rods have previously been cut off squarely at least on the forward end when they are laid on the conveyor 10. The rods 9 used will, of course, be of a suitable wood and of uniform diameter, and may be helically and/or longitudinally grooved or scored, so that when the blanks 8 cut therefrom are bevelled off at both ends they are finished and ready for use. Each group of freshly cut dowel pin blanks 8, when ejected, moves the ones ahead onto conveyor 45, and that in turn feeds them to the sprocket 55 on which they are carried to the cutters 51. Belt 56 gives each blank 8 a spin as it comes into contact with it in moving between the cutters, so that a smooth bevelling job is assured on both ends. The blanks 8 are free to move endwise in pockets 58 and a stationary stop plate (not shown) is provided on one side of sprocket 55 to center the blanks relative to the cutters 51 by sliding contact of the ends of the blanks on said plate as the sprocket moves the blanks into bevelling position and suitable means being provided to push the blanks endwise toward the stop plate from the other side of the sprocket 55, such as a leaf spring fixedly supported and arranged to be slidably engaged by the ends of the blanks as they are moved into the bevelling position. I may use a nozzle supplied with compressed air at the latter point to blow the blanks endwise toward the stop plate. It takes very little force to shift the blanks 8 the small distance necessary to center the same. Directions of movement and of rotation are indicated by arrows in the various views.

It is believed the foregoing description conveys a good understanding of the objects and advantages of my invention. The appended claims have been drawn to cover all legitimate modifications and adaptations.

I claim:

1. In a dowel making machine, a pair of closely spaced coaxial bevelled cutters having their bevel sides disposed toward each other for operation simultaneously on opposite ends of dowel pins fed thereto, means for driving the cutters, a rotary substantially cylindrical work carrier disposed below said cutters having circumferentially spaced recesses provided in the periphery thereof adapted to receive dowel pins with freedom for their rotation while they are being moved into operative contact with the cutters, means for driving said work carrier, an endless flexible friction drive belt disposed substantially horizontally between the cutters over the work carrier and having the lower flight thereof disposed substantially tangent to said work carrier and arranged to transmit drive frictionally to the dowel pins individually and in pairs as they arrive at and pass through the zone of cutting operation relative to the cutters, and means for driving said belt.

2. A machine as set forth in claim 1 including means for adjusting the cutters in a substantially radial direction relative to the work carrier.

3. A machine as set forth in claim 1 wherein the friction drive belt is adjustable in a substantially radial direction relative to the work carrier.

4. A machine as set forth in claim 1 wherein the friction drive belt is adjustable in a substantially radial direction relative to the work carrier, the machine including means for adjusting the cutters in a substantially radial direction relative to the work carrier.

5. In a dowel making machine, a pair of closely spaced coaxial bevelled cutters having their bevel sides disposed toward each other for operation simultaneously on opposite ends of dowel pins fed thereto, means for driving the cutters, a rotary substantially cylindrical work carrier disposed below said cutters having circumferentially spaced recesses provided in the periphery thereof adapted to receive dowel pins with freedom for their rotation while they are being moved into operative contact with the cutters, means for driving said work carrier, an endless flexible friction drive belt disposed substantially horizontally between the cutters over the work carrier and having the lower flight thereof disposed substantially tangent to said work carrier and arranged to transmit drive frictionally to the dowel pins individually and in pairs as they arrive at and pass through the zone of the cutting operation relative to the cutters, and endless conveyor belt for frictionally conveying dowel pins disposed on and in transverse relation thereto to the work carrier, and an escapement means operated in timed relation to said carrier for releasing dowel pins singly from the outgoing end of said conveyor belt to the work carrier.

CARL L. JOHNSON.

References Cited in the file of this patent

UNITED STATES PATENTS

| Number | Name | Date |
| --- | --- | --- |
| 331,733 | Robinson | Dec. 1, 1885 |
| 719,639 | Beck | Feb. 3, 1903 |
| 733,362 | Beck | July 14, 1903 |
| 1,005,982 | Kuntz | Oct. 17, 1911 |
| 1,175,831 | Spinney | Mar. 14, 1916 |
| 1,856,169 | Rosener et al. | May 3, 1932 |